(12) United States Patent
Tsai et al.

(10) Patent No.: US 10,331,946 B2
(45) Date of Patent: Jun. 25, 2019

(54) GESTURE CONTROL DEVICE AND METHOD

(71) Applicant: HON HAI PRECISION INDUSTRY CO., LTD., New Taipei (TW)

(72) Inventors: Tung-Tso Tsai, New Taipei (TW); Chih-Te Lu, New Taipei (TW); Jung-Hao Yang, New Taipei (TW); Chih-Yuan Chuang, New Taipei (TW); Chin-Pin Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 26 days.

(21) Appl. No.: 15/604,658

(22) Filed: May 25, 2017

(65) Prior Publication Data
US 2017/0344814 A1    Nov. 30, 2017

(30) Foreign Application Priority Data

May 27, 2016 (TW) .............................. 105116690 A

(51) Int. Cl.
| G06K 9/00 | (2006.01) |
| G06K 9/48 | (2006.01) |
| G06K 9/78 | (2006.01) |
| G06K 9/52 | (2006.01) |

(Continued)

(52) U.S. Cl.
CPC ......... G06K 9/00355 (2013.01); G06F 3/017 (2013.01); G06K 9/00201 (2013.01); G06K 9/224 (2013.01); G06K 9/481 (2013.01); G06K 9/52 (2013.01); G06K 9/78 (2013.01)

(58) Field of Classification Search
None
See application file for complete search history.

(56) References Cited

U.S. PATENT DOCUMENTS

| 8,599,132 | B2 * | 12/2013 | Chen ....................... G06F 3/017 345/158 |
| 9,009,516 | B1 * | 4/2015 | Gabayan ............... G06F 1/3206 713/323 |
| 9,448,636 | B2 * | 9/2016 | Balzacki ................. G06F 3/017 |

(Continued)

OTHER PUBLICATIONS

Davis, James, and Mubarak Shah. "Visual gesture recognition." IEE Proceedings—Vision, Image and Signal Processing 141, No. 2 (1994): 101-106. (Year: 1994).*

(Continued)

Primary Examiner — Michelle M Entezari
(74) Attorney, Agent, or Firm — ScienBiziP, P.C.

(57) ABSTRACT

A gesture control system for a device for determining which one of a plurality of devices is to be controlled by a gesture acquires images of a gesture from each of the electronic devices; establishes a three dimensional coordinate system for the gesture image; calculates an angle between a first vector from a start point of the gesture to a center point of each electronic device and a second vector from an end point of the gesture to the center point of each electronic device. Thereby, the electronic device intended as the object to be controlled by the gesture can be determined, according to whether the angle between the first vector and the second vector is less than a preset value. A gesture control method is also provided.

8 Claims, 4 Drawing Sheets

(51) Int. Cl.
*G06K 9/22* (2006.01)
*G06F 3/01* (2006.01)

(56) References Cited

U.S. PATENT DOCUMENTS

| | | | | |
|---|---|---|---|---|
| 9,459,697 | B2* | 10/2016 | Bedikian | G06F 3/017 |
| 2011/0111798 | A1* | 5/2011 | Jeon | G06F 3/017 |
| | | | | 455/556.1 |
| 2013/0322702 | A1* | 12/2013 | Piemonte | G06T 15/005 |
| | | | | 382/113 |
| 2015/0054820 | A1* | 2/2015 | Ji | G06F 3/017 |
| | | | | 345/418 |
| 2015/0116200 | A1* | 4/2015 | Kurosawa | B60K 35/00 |
| | | | | 345/156 |
| 2015/0177842 | A1* | 6/2015 | Rudenko | G06F 3/017 |
| | | | | 345/156 |
| 2016/0291696 | A1* | 10/2016 | Rider | G06F 3/1454 |
| 2016/0299635 | A1* | 10/2016 | Glover | G06F 3/017 |
| 2017/0123501 | A1* | 5/2017 | Kuo | G06K 9/4604 |
| 2017/0277267 | A1* | 9/2017 | Liu | G06F 3/011 |

OTHER PUBLICATIONS

Zhen-Zhong Li, Yuan-Xiang Zhang, Zhi-Heng Li; A Fingertip Detection and Interaction System Based on Stereo Vision; http://cvl.ice.cycu.edu.tw/publications/Li2011.pdf; 2011; pp. 2-9, Form 1; Taiwan.

* cited by examiner

GESTURE CONTROL DEVICE AND METHOD

CROSS-REFERENCE TO RELATED APPLICATIONS

This application claims priority to Taiwan Patent Application No. 105116690 filed on May 27, 2016.

FIELD

The subject matter herein generally relates to gesture control, and particularly to a gesture control device and method capable of determining an object to be controlled by gesture, among a plurality of electronic devices.

BACKGROUND

Electronic devices can be controlled by gestures. A gesture command usually controls one electronic device. However, a number of electronic devices may be close together, and it is difficult to determine which one of the electronic devices should be controlled by the gesture.

BRIEF DESCRIPTION OF THE DRAWINGS

Implementations of the present technology will now be described, by way of example only, with reference to the attached figures.

DETAILED DESCRIPTION

Figure 1:
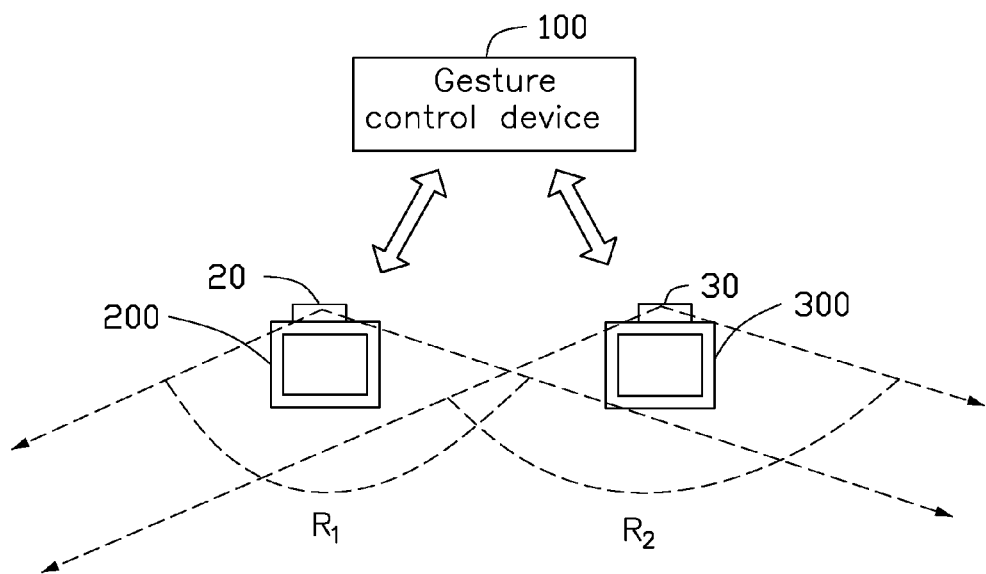
FIG. 1 is a block diagram illustrating an exemplary embodiment of an operating environment of a device with gesture control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "comprising" means "including, but not necessarily limited to", it specifically indicates open-ended inclusion or membership in a so-described combination, group, series, and the like.

FIG. 1 illustrate an exemplary embodiment of an operating environment of a gesture control device 100. The gesture control device 100 can communicate with a number of electronic devices. The gesture control device 100 can determine which one of the electronic devices, including a device of which it is part, should be controlled by a gesture. In the exemplary embodiment, the electronic devices can be, but are not limited to, televisions, air conditioners, fridges, multimedia players, monitors, computers, and the like. The gesture control device 100 can communicate with the electronic devices wirelessly, for example by using WIFI, Global System for Mobile Communications (GSM), General Packet Radio Service (GPRS), Code Division Multiple Access (CDMAW-CDMA), CDMA2000, IMT Single Carrier, Enhanced Data Rates for GSM Evolution (EDGE), Long-Term Evolution, (LTE), Time-Division LTE, (TD-LTE), High Performance Radio Local Area Network, (HiperLAN), High Performance Radio Wide Area Network, (HiperWAN), Local Multipoint Distribution Service, (LMDS), Worldwide Interoperability for Microwave Access, (WiMAX), ZIGBEE, BLUETOOTH, Flash Orthogonal Frequency-Division Multiplexing, (Flash-OFDM), High Capacity Spatial Division Multiple Access, (HC-SDMA), Universal Mobile Telecommunications System, (UMTS), UMTS Time-Division Duplexing, (UMTS-TDD), Evolved High Speed Packet Access, (HSPA+), Time Division Synchronous Code Division Multiple Access, (TD-SCDMA), Evolution-Data Optimized, (EV-DO), Digital Enhanced Cordless Telecommunications, (DECT), or the like. The gesture control device 100 also can communicate with the electronic devices by wires.

In the exemplary embodiment, a first electronic device 200 and a second electronic device 300 are taken as examples to communicate with the gesture control device 100. In the exemplary embodiment, the first electronic device 200 includes a first image capturing device 20, the second electronic device 300 includes a second image capturing device 30. The first image capturing device 20 is a depth camera configured to capture images of gestures in a first effective range R1, the second image capturing device 30 is a depth camera configured to capture gesture images in a second effective range R2. The first electronic device 200 and the second electronic device 300 execute functions according to gestures captured by the image capturing devices 20 and 30.

In the exemplary embodiment, the gesture control device 100 can be, but is not limited to, a server, a communication device such as a Set Top Box, or an integrated chip or programming modules embedded in the first electronic device 200 or the second electronic device 300.

Figure 2:
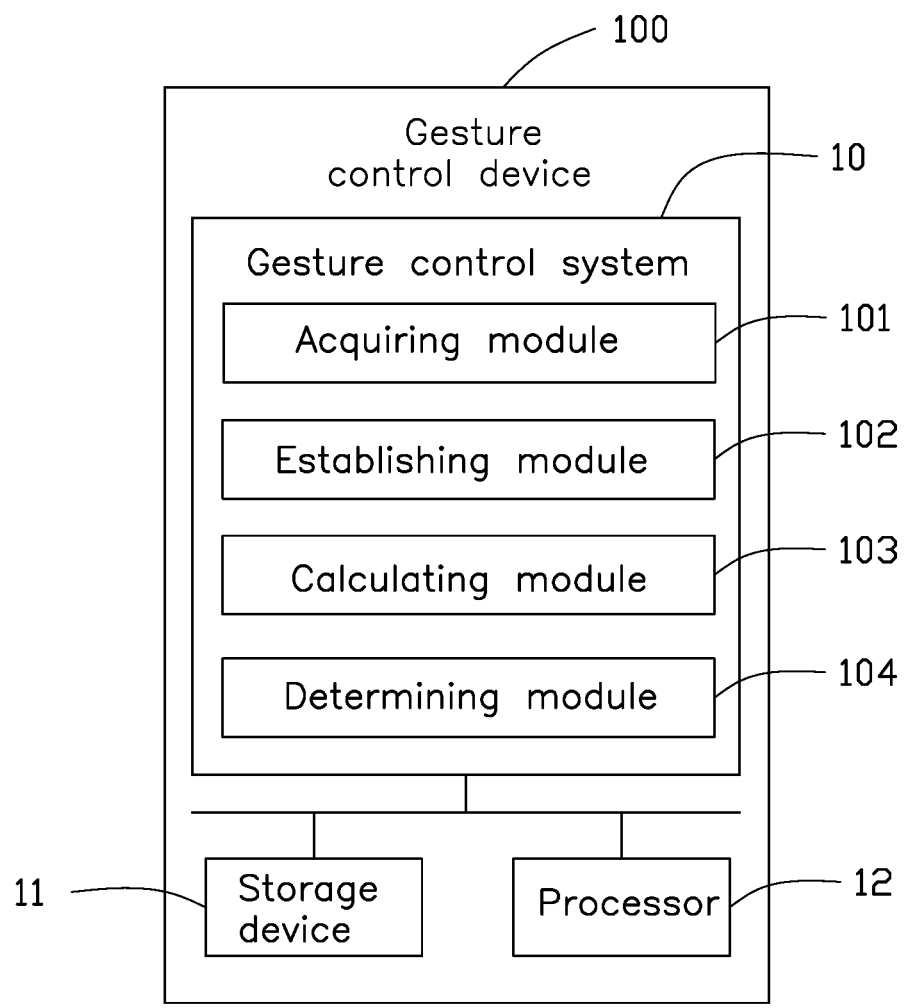
FIG. 2 is a block diagram illustrating an exemplary embodiment of a gesture control system running in the device of FIG. 1.

Referring to FIG. 2, in the exemplary embodiment, the gesture control device 100 can include, but is not limited to, a storage device 11 and a processor 12. The storage device 11 can be, but is not limited to, an internal storage system, such as a flash memory, a random access memory (RAM) for temporary storage of information, and/or a read-only memory (ROM) for permanent storage of information. The storage device 11 can also be a storage system, such as a hard disk, a storage card, or a data storage medium. The processor 12 can be, but is not limited to, a central processing unit, a digital signal processor, or a single chip, for example.

In the exemplary embodiment, the storage device 11 can store a gesture control system 10. The gesture control system 10 can include a number of modules, which are collection of software instructions stored in the storage device 11 and executed by the processor 12. In the exemplary embodiment, the gesture control system 10 can include an acquiring module 101, an establishing module 102, a calculating module 103, and a determining module 104.

The acquiring module 101 acquires an image of a gesture from each of the electronic devices (for example, the first image capturing device 20 and the second image capturing device 30), the gesture image can include a depth information as to objects in the images. In the exemplary embodiment, the gesture image can include a number of pictures, thus a movement track of a gesture can be determined according to the pictures. In the exemplary embodiment, the first image capturing device 20 and the second image capturing device 30 capture the gesture image when a gesture is detected in the effective area of the first image capturing device 20 and the second image capturing device 30.

The establishing module 102 establishes a three dimensional coordinate system for each image captured by each of the electronic devices. The establishing module 102 further determines a coordinate of a central point of each of the electronic devices, and determines a coordinate of a start point of the gesture and a coordinate of an end point of the gesture. In the exemplary embodiment, plane coordinates of the gesture image are determined as an X axis and a Y axis of the coordinate system, and the depth information of the gesture image is determined as a Z axis of the coordinate system. In the exemplary embodiment, the coordinate of the center points of the first electronic device 200 and the second electronic device 300 are predetermined according to a position of the image capturing device 20 and 30. For example, if the first electronic device 200 is a computer, and the image capturing device 20 is located in the middle of an upper edge of a screen of the first electronic device 200, the coordinate of the center point of the first electronic device 200 will be predetermined as the coordinate of the center point of the screen of the first electronic device 200. The start point of the gesture is a position of a hand when the gesture is started. The end point of the gesture is a position where the hand may be when the gesture is ended. In the exemplary embodiment, a gesture is determined as ended if the movement of the hand stops for a preset time, for example 2 seconds.

Figure 3:
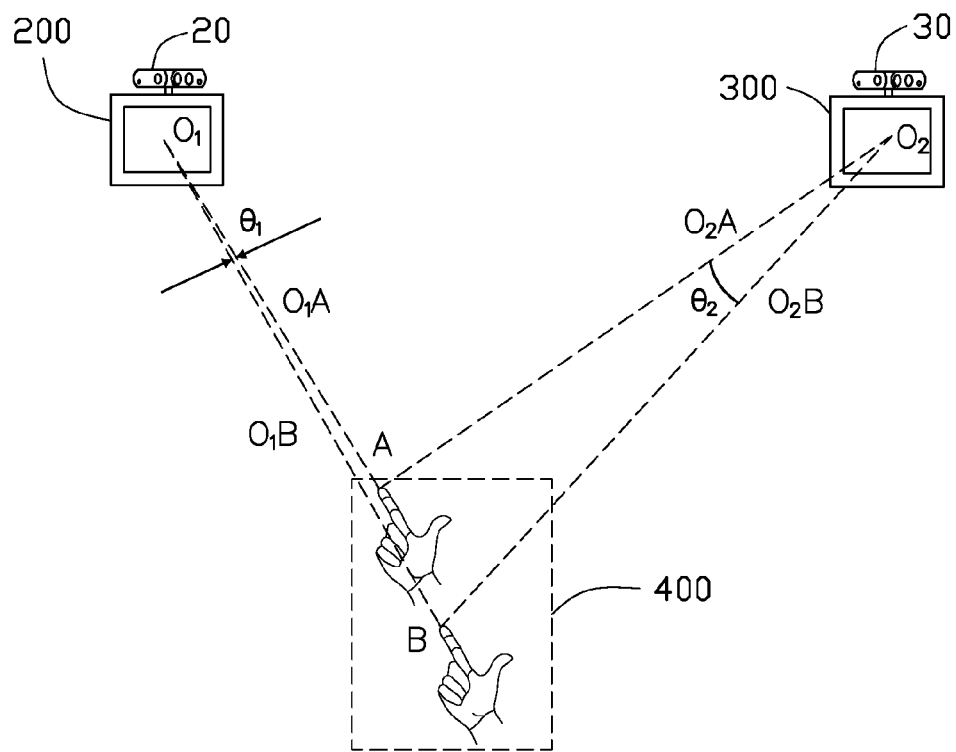
FIG. 3 is a schematic diagram illustrating an exemplary embodiment of a working process of the device of FIG. 1.

Referring to FIG. 3, for example, the first image capturing device 20 is located in the middle of the upper edge of the first electronic device 200, the second image capturing device 30 is located in the middle of the upper edge of the second electronic device 300. The first electronic device 200 includes a first center point $O_1$, the second electronic device 300 includes a second center point $O_2$. When a gesture appears in an effective area 400, the first image capturing device 20 and the second image capturing device 30 capture images of the gesture. The gesture control device 100 establish a three dimensional coordinate system for each gesture image captured by the first image capturing device 20 and the second image capturing device 30. In the exemplary embodiment, the establishing module 102 establish a first three dimensional coordinate system for the gesture image captured by the first image capturing device 20 and establish a second three dimensional coordinate system for the gesture image captured by the second image capturing device 30.

The calculating module 103 calculates a vector from the start point of the gesture to the center point of each of the electronic device and calculates a vector from the end point of the gesture to the center point of each of the electronic device. For example, the calculating module 103 calculates a first vector $O_1A$ from the start point A of the gesture to the center point $O_1$ of the first electronic device 200. The calculating module 103 also calculates a second vector $O_2A$ from the start point A of the gesture to the center point $O_2$ of the second electronic device 300, as shown in FIG. 3. The calculating module 103 further calculates a third vector $O_1B$ from the end point B of the gesture to the center point $O_1$ of the first electronic device 200, and calculates a fourth vector $O_2B$ from the end point B of the gesture to the center point $O_2$ of the second electronic device 300, as shown in FIG. 3.

The calculating module 103 further calculates an angle between the vector from the start point of the gesture to the center point of each electronic device and the vector form the end point of the gesture to the center point of each electronic device. For example, the calculating module 103 calculates a first angle $\theta 1$ between the first vector $O_1A$ and the third vector $O_1B$, and a second angle $\theta 2$ between the second vector $O_2A$ and the fourth vector $O_2B$. In the exemplary embodiment, the calculating module 103 calculates an angle $\theta$ between two vectors according to a formula:

$$\cos\theta = \vec{a}\cdot\vec{b}/|\vec{a}|\cdot|\vec{b}| = a_1b_1+a_2b_2+a_3b_3/(\sqrt{a_1^2+a_2^2+a_3^2}\cdot\sqrt{b_1^2+b_2^2+b_3^2}); \text{ here, } \vec{a}=(a_1,a_2,a_3), \vec{b}=(b_1,b_2,b_3).$$

For example, the calculating module 103 determines that the coordinate of the start point A of the gesture is $(x_1, y_1, z_1)$ and the coordinate of the end point B of the gesture is $(x_2, y_2, z_2)$. The coordinate of the center point $O_1$ of the first electronic device 200 is determined as $(x_0, y_0, z_0)$ and the coordinate of the center point $O_2$ of the second electronic device 300 is $(x_3, y_3, z_3)$. The calculating module 103 determines the first vector $O_1A$ is $(x_1-x_0, y_1-y_0, z_1-z_0)$, the second vector $O_2A$ is $(x_1-x_3, y_1-y_3, z_1-z_3)$, the third vector $O_1B$ is $(x_2-x_0, y_2-y_0, z_2-z_0)$, and the fourth vector $O_2B$ is $(x_2-x_3, y_2-y_3, z_2-z_3)$.

The calculating module 103 calculates the first angle $\theta 1$ according to a formula:

$$\cos\theta_1 = \frac{(x_1-x_0, y_1-y_0, z_1-z_0)\cdot(x_2-x_0, y_2-y_0, z_2-z_0)}{\sqrt{(x_1-x_0)^2+(y_1-y_0)^2+(z_1-z_0)^2}\cdot\sqrt{(x_2-x_0)^2+(y_2-y_0)^2+(z_2-z_0)^2}};$$

the calculating module calculates the second angle $\theta 2$ according to the formula:

$$\cos\theta_2 = \frac{(x_1-x_3, y_1-y_3, z_1-z_3)\cdot(x_2-x_3, y_2-y_3, z_2-z_3)}{\sqrt{(x_1-x_3)^2+(y_1-y_3)^2+(z_1-z_3)^2}\cdot\sqrt{(x_2-x_3)^2+(y_2-y_3)^2+(z_2-z_3)^2}}.$$

The determining module 104 determines which one of the electronic devices is a target controlled by the gesture by determining which one of the angle is less than a preset value. For example, the determining module 104 determines which one of the first electronic device 200 and the second electronic device 300 is most likely the object to be controlled by the gesture by determining which of the first angle θ1 and the second angle θ2 is less than a preset value δ. In detail, the determining module 104 compares the first angle θ1 and the second angle θ2 with the preset value δ. If the determining module 104 determines that the first angle θ1 is greater than the preset value δ and the second angle θ2 is less than the preset value δ, the determining module 104 determines that the second electronic device 300 is the intended object. If the determining module 104 determines that the first angle θ1 is less than the preset value δ and the second angle θ2 is greater than the preset value δ, the determining module 104 determines that the first electronic device 200 is the intended object. If both of the first angle θ1 and the second angle θ2 are less than the preset value δ, the determining module 104 determines an error state, the object to be controlled cannot be determined.

Figure 4:
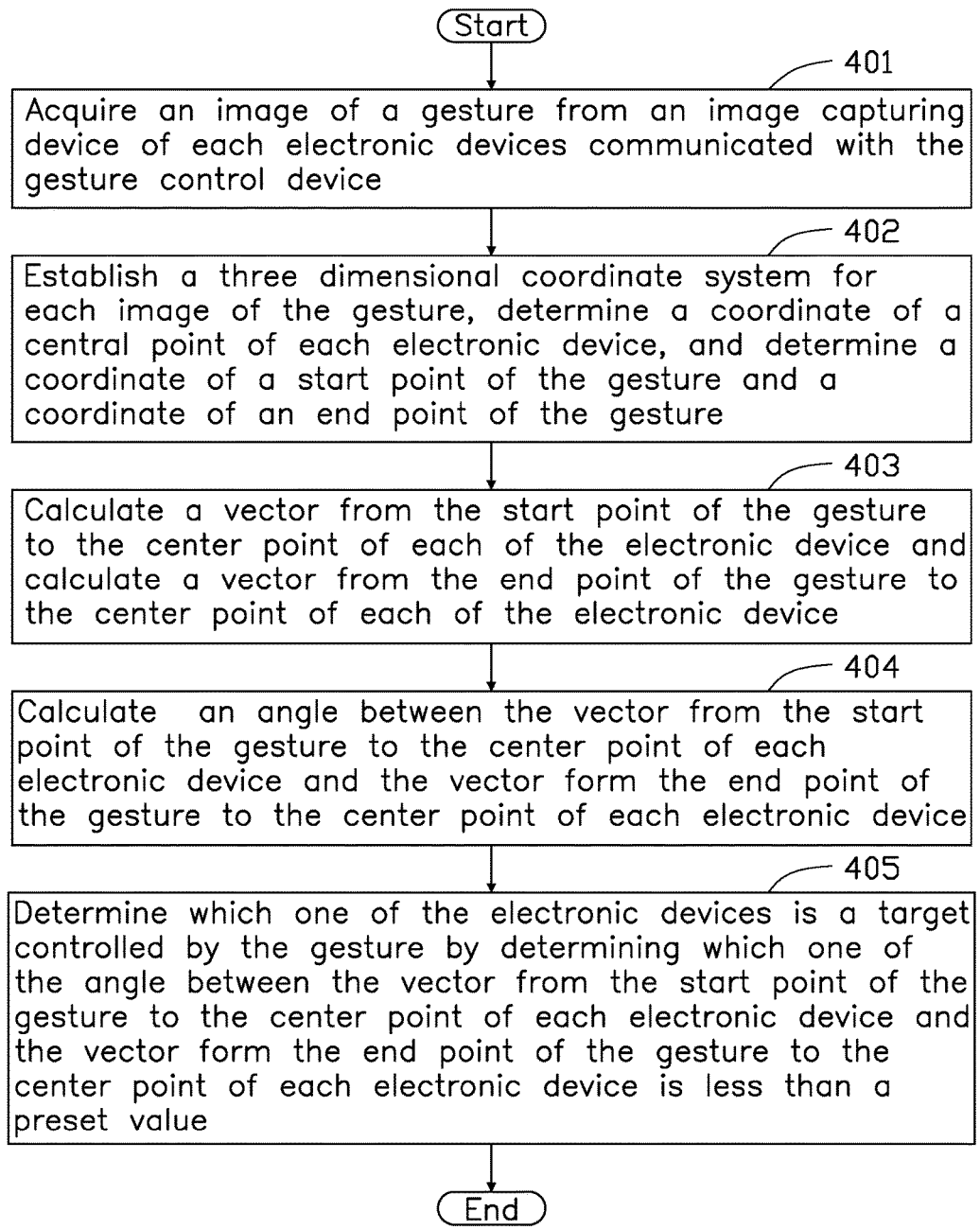
FIG. 4 is a flowchart illustrating an exemplary embodiment of a gesture control method.

A method for determining which one of a plurality of electronic devices is to be controlled by a gesture is illustrated in FIG. 4. The method is provided by way of example, as there are a variety of ways to carry out the method. Each block shown in FIG. 4 represent one or more processes, methods, or subroutines carried out in the example method. Additionally, the illustrated order of blocks is by example only and the order of the blocks can be changed. The example method can begin at block 401.

At block 401, an acquiring module of a gesture control device acquires an image of a gesture from an image capturing device of each electronic devices communicated with the gesture control device. In the exemplary embodiment, the gesture image can include a depth information as to objects in the images. In the exemplary embodiment, the gesture image can include a number of pictures, thus a movement track of a gesture can be determined according to the pictures.

At block 402, a establishing module establishes a three dimensional coordinate system for each image of the gesture, determines a coordinate of a central point of each electronic device, and determines a coordinate of a start point of the gesture and a coordinate of an end point of the gesture.

At block 403, a calculating module calculates a vector from the start point of the gesture to the center point of each of the electronic device and calculates a vector from the end point of the gesture to the center point of each of the electronic device.

At block 404, the calculating module calculates an angle between the vector from the start point of the gesture to the center point of each electronic device and the vector form the end point of the gesture to the center point of each electronic device.

At block 405, a determining module determines which one of the electronic devices is a target controlled by the gesture by determining which one of the angle between the vector from the start point of the gesture to the center point of each electronic device and the vector form the end point of the gesture to the center point of each electronic device is less than a preset value.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being exemplary embodiments of the present disclosure.

What is claimed is:

1. A gesture control device to communicate with at least two electronic devices, each of the electronic devices comprising an image capturing device, the gesture control device comprising:
   at least one processor; and
   at least one storage device storing one or more programs, when executed by the at least one processor, the one or more programs cause the at least one processor to:
      acquire a gesture image from the image capturing device of each electronic device, the gesture image comprising a depth information, the gesture image comprising a plurality of pictures, a movement track of a gesture being determined according to the pictures;
      establish a three dimensional coordinate system for the gesture image acquired by each image capturing device;
      determine a coordinate of a center point of each of the electronic devices, and determine a coordinate of a start point of the gesture and a coordinate of an end point of the gesture;
      calculate a first vector from the start point of the gesture to the center point of each electronic device according to the coordinate of the start point of the gesture and the coordinate of the center point of each electronic device; and calculate a second vector from the end point of the gesture to the center point of each electronic device according to the coordinate of the end point of the gesture and the coordinate of the center point of each electronic device;
      calculate an angle between the first vector from the start point of the gesture to the center point of each electronic device and the second vector from the end point of the gesture to the center point of each electronic device; and
      determine which one of electronic device is intended as a target controlled by the gesture by determining which one of the angle between the first vector from the start point of the gesture to the center point of the electronic device and the second vector from the end point of the gesture to the center point of the electronic device is less than a preset value;
   wherein a formula for calculating the vectors is: $(x_1-x_0, y_1-y_0, z_1-z_0)$, wherein $(x_1, y_1, z_1)$ is the coordinate of the start point of the gesture or the coordinate of the end point of the gesture, $(x_0, y_0, z_0)$ is the coordinate of the center point of the electronic devices.

2. The gesture control device of claim 1, wherein the start point of the gesture is a position where a specific point of a hand is when the gesture is started, the end point of the gesture is a position where the specific point of the hand is when the gesture is ended.

3. The gesture control device of claim 2, wherein the gesture is determined as ended if a movement of the gesture stop for a preset time range.

4. The gesture control device of claim 1, wherein the processor calculates an angle θ between two vectors according to a formula:

$$\cos\theta = \vec{a}\cdot\vec{b}/|\vec{a}|\cdot|\vec{b}| = a_1b_1+a_2b_2+a_3b_3/(\sqrt{a_1^2+a_2^2+a_3^2}\cdot\sqrt{b_1^2+b_2^2+b_3^2}); \text{ wherein } \vec{a}=(a_1,a_2,a_3), \vec{b}=(b_1,b_2,b_3).$$

5. A gesture control method applied in a gesture control device, the gesture control device configured to communicate with at least two electronic devices, each of the electronic devices comprising an image capturing device, the gesture control method comprising:

acquiring a gesture image from the image capturing device of each electronic device, the gesture image comprising a depth information, the gesture image comprising a plurality of pictures, a movement track of a gesture being determined according to the pictures;

establishing a three dimensional coordinate system for the gesture image acquired by each image capturing device;

determining a coordinate of a center point of each of the electronic devices, and determining a coordinate of a start point of the gesture and a coordinate of an end point of the gesture;

calculating a first vector from the start point of the gesture to the center point of each electronic device according to the coordinate of the start point of the gesture and the coordinate of the center point of each electronic device; and calculating a second vector from the end point of the gesture to the center point of each electronic device according to the coordinate of the end point of the gesture and the coordinate of the center point of each electronic device;

calculating an angle between the first vector from the start point of the gesture to the center point of each electronic device and the second vector form the end point of the gesture to the center point of each electronic device; and determine which one of electronic device is intended as a target controlled by the gesture by determining which one of the angle between the first vector from the start point of the gesture to the center point of the electronic device and the second vector from the end point of the gesture to the center point of the electronic device is less than a preset value;

wherein a formula for calculating the vectors is: $(x_1-x_0, y_1-y_0, z_1-z_0)$, wherein $(x_1, y_1, z_1)$ is the coordinate of the start point of the gesture, or the coordinate of the end point of the gesture, $(x_0, y_0, z_0)$ is the coordinate of the center point of the electronic devices.

6. The gesture control method of claim 5, wherein the start point of the gesture is a position where a specific point of a hand is when the gesture is started, the end point of the gesture is a position where the specific point of the hand is when the gesture is ended.

7. The gesture control method of claim 6, wherein the gesture is determined as ended if a movement of the gesture stop for a preset time range.

8. The gesture control method of claim 5, wherein an angle θ between two vectors can be calculated according to a formula:

$\cos\theta = \vec{a}\cdot\vec{b}/|\vec{a}|\cdot|\vec{b}| = a_1b_1+a_2b_2+a_3b_3/(\sqrt{a_1^2+a_2^2+a_3^2}\cdot\sqrt{b_1^2+b_2^2+b_3^2})$; wherein $\vec{a}=(a_1,a_2,a_3)$, $\vec{b}=(b_1,b_2,b_3)$.

* * * * *